(12) United States Patent
Nonaka

(10) Patent No.: US 8,502,078 B2
(45) Date of Patent: Aug. 6, 2013

(54) FLAME-RETARDANT COMPOSITION, INSULATED ELECTRIC WIRE, AND WIRING HARNESS USING THE SAME

(75) Inventor: Tsuyoshi Nonaka, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 141 days.

(21) Appl. No.: 12/995,273

(22) PCT Filed: Jun. 19, 2009

(86) PCT No.: PCT/JP2009/061168
§ 371 (c)(1), (2), (4) Date: Nov. 30, 2010

(87) PCT Pub. No.: WO2009/157375
PCT Pub. Date: Dec. 30, 2009

(65) Prior Publication Data
US 2011/0079428 A1    Apr. 7, 2011

(30) Foreign Application Priority Data
Jun. 27, 2008 (JP) ................................ 2008-169133
Apr. 21, 2009 (JP) ................................ 2009-102533

(51) Int. Cl.
*H01B 7/00* (2006.01)

(52) U.S. Cl.
USPC ................ 174/110 R; 174/121 R; 174/121 A

(58) Field of Classification Search
USPC .................... 174/102 R, 102 SC, 103, 110 R, 174/110 N–110 PM, 120 R, 120 SC, 121 A; 525/71, 74, 77, 78, 80, 194, 285, 232, 240; 428/372, 375, 379, 383
See application file for complete search history.

(56) References Cited

U.S. PATENT DOCUMENTS
7,709,740 B2 * 5/2010 Reyes ........................ 174/110 R
2006/0128866 A1 * 6/2006 Diakoumakos et al. ...... 524/445
(Continued)

FOREIGN PATENT DOCUMENTS
DE    11 2004 000 911 T5    4/2006
DE    11 2007 003 027 T5    10/2009
(Continued)

OTHER PUBLICATIONS
International Search Report issued in Application No. PCT/JP2009/061168; Dated Jul. 28, 2009 (With Translation).
(Continued)

*Primary Examiner* — William H Mayo, III
(74) *Attorney, Agent, or Firm* — Oliff & Berridge, PLC

(57) ABSTRACT

A flame-retardant composition and an insulated electric wire and a wiring harness using the flame-retardant composition. The flame-retardant composition includes a base resin that has a flexural modulus of 500 MPa or more and a Charpy impact strength at −20° C. of 1 KJ/m² or more, and a flame retardant that is a pulverized natural mineral containing magnesium hydroxide as a main ingredient. The base resin preferably contains polypropylene as a main ingredient, and the content of the magnesium hydroxide is preferably 30 to 250 parts by mass with respect to 100 parts by mass of the base resin. The insulated electric wire includes a conductor and the flame-retardant composition that covers the conductor. The wiring harness includes the insulated electric wire.

16 Claims, 1 Drawing Sheet

| | | Flexural modulus | Charpy impact strength at −20°C (KJ/m²) | Present example | | | | | | Comparative example | | | | | |
|---|---|---|---|---|---|---|---|---|---|---|---|---|---|---|---|
| | | | | 1 | 2 | 3 | 4 | 5 | 6 | 1 | 2 | 3 | 4 | 5 | 6 |
| Constitution | (A) Base resin | | | | | | | | | | | | | | |
| | (A-1) Polyethylene | 500 | 1 | 50 | | | | | | | | | | | |
| | (A-2) Polyethylene | 600 | 6 | | 50 | | | | | | | | | | |
| | (A-3) Polyethylene | 1000 | 10 | | | 50 | | | | | | | | | |
| | (A-4) Polypropylene | 500 | 7 | | | | 50 | | | | | | | | |
| | (A-5) Polypropylene | 1000 | 10 | | | | | 50 | | | | | | | |
| | (A-6) Polypropylene | 1500 | 20 | | | | | | 50 | | | | | | |
| | (A-7) Polyethylene | 400 | 5 | | | | | | | 50 | | | | | |
| | (A-8) Polyethylene | 600 | 0.5 | | | | | | | | 50 | | | | |
| | (A-9) Polyethylene | 300 | 10 | | | | | | | | | 50 | | | |
| | (A-10) Polypropylene | 500 | 0.8 | | | | | | | | | | 50 | | |
| | (A-11) Polypropylene | 400 | 15 | | | | | | | | | | | 50 | |
| | (A-12) Polypropylene | 1500 | 0.8 | | | | | | | | | | | | 50 |
| | (B) Flame retardant | | | 49 | 49 | 49 | 49 | 49 | 49 | 49 | 49 | 49 | 49 | 49 | 49 |
| | (C) Antioxidant | | | 1 | 1 | 1 | 1 | 1 | 1 | 1 | 1 | 1 | 1 | 1 | 1 |
| Assessment | Cold resistance temperature (°C) | | | −30 | −25 | −30 | −25 | −25 | −30 | −30 | −10 | −30 | −15 | −25 | −10 |
| | Wear resistance | | | Pass | Pass | Pass | Pass | Pass | Pass | Fail | Pass | Fail | Pass | Fail | Pass |

U.S. PATENT DOCUMENTS

| | | | |
|---|---|---|---|
| 2006/0151758 A1* | 7/2006 | Reyes | 252/601 |
| 2006/0194909 A1 | 8/2006 | Inoue et al. | |
| 2007/0261877 A1* | 11/2007 | Mhetar et al. | 174/110 R |
| 2007/0261878 A1* | 11/2007 | Kosaka et al. | 174/110 SR |
| 2007/0262483 A1* | 11/2007 | Grasselli et al. | 264/172.19 |
| 2010/0000787 A1 | 1/2010 | Shimada et al. | |
| 2010/0025070 A1 | 2/2010 | Nonaka et al. | |

FOREIGN PATENT DOCUMENTS

| | | |
|---|---|---|
| JP | B2-3339154 | 10/2002 |
| JP | 2008-144066 * | 6/2008 |
| JP | A-2008-144066 | 6/2008 |
| WO | WO 2008/062820 A1 | 5/2008 |

OTHER PUBLICATIONS

Chinese Office Action issued in Application No. 200980124735.2; Dated Apr. 28, 2012 (With Translation).

Oct. 25, 2012 Office Action issued in German Patent Application No. 11 2009 001 623.5 (with English Translation).

* cited by examiner

|  | Flexural modulus | Charpy impact strength at −20°C (KJ/m²) | Present example | | | | | | Comparative example | | | | | |
|---|---|---|---|---|---|---|---|---|---|---|---|---|---|---|
|  |  |  | 1 | 2 | 3 | 4 | 5 | 6 | 1 | 2 | 3 | 4 | 5 | 6 |
| (A) Base resin | | | | | | | | | | | | | | |
| (A-1) Polyethylene | 500 | 1 | 50 | | | | | | | | | | | |
| (A-2) Polyethylene | 600 | 6 | | 50 | | | | | | | | | | |
| (A-3) Polyethylene | 1000 | 10 | | | 50 | | | | | | | | | |
| (A-4) Polypropylene | 500 | 7 | | | | 50 | | | | | | | | |
| (A-5) Polypropylene | 1000 | 10 | | | | | 50 | | | | | | | |
| (A-6) Polypropylene | 1500 | 20 | | | | | | 50 | | | | | | |
| (A-7) Polyethylene | 400 | 5 | | | | | | | 50 | | | | | |
| (A-8) Polyethylene | 600 | 0.5 | | | | | | | | 50 | | | | |
| (A-9) Polyethylene | 300 | 10 | | | | | | | | | 50 | | | |
| (A-10) Polypropylene | 500 | 0.8 | | | | | | | | | | 50 | | |
| (A-11) Polypropylene | 400 | 15 | | | | | | | | | | | 50 | |
| (A-12) Polypropylene | 1500 | 0.8 | | | | | | | | | | | | 50 |
| (B) Flame retardant | | | 49 | 49 | 49 | 49 | 49 | 49 | 49 | 49 | 49 | 49 | 49 | 49 |
| (C) Antioxidant | | | 1 | 1 | 1 | 1 | 1 | 1 | 1 | 1 | 1 | 1 | 1 | 1 |
| Cold resistance temperature (°C) | | | −30 | −25 | −30 | −25 | −25 | −30 | −30 | −10 | −30 | −15 | −25 | −10 |
| Wear resistance | | | Pass | Pass | Pass | Pass | Pass | Pass | Fail | Pass | Fail | Pass | Fail | Pass |

FLAME-RETARDANT COMPOSITION, INSULATED ELECTRIC WIRE, AND WIRING HARNESS USING THE SAME

TECHNICAL FIELD

The present invention relates to a frame-retardant composition, and an insulated electric wire and a wiring harness using the same.

BACKGROUND ART

Conventionally, for an insulated electric wire that is preferably used for wiring of parts for a car such as an automobile and parts for an electrical/electronic appliance, there has been widespread use of an insulated electric wire in which a conductor is covered with a vinyl chloride resin composition to which a halogenous flame retardant is added.

However, this kind of vinyl chloride resin composition includes halogen elements, so that it emits harmful halogenous gas into the atmosphere in case of car fire or at the time of disposing of an electrical/electronic appliance by incineration, causing environmental pollution.

From the view point of reducing loads on the global environment, a so-called non-halogenous flame-retardant composition including an olefin resin that does not emit harmful halogenous gas during combustion to which metal hydroxide such as magnesium hydroxide that is a non-halogenous flame retardant is added has been recently used as an alternative to the vinyl chloride resin composition.

In this kind of flame-retardant composition, a large amount of magnesium hydroxide is added in order to impart sufficient flame retardancy. Synthetic magnesium hydroxide that is synthesized from sea water is comparatively expensive, and therefore, low-price natural magnesium hydroxide has been recently used in order to reduce the production cost.

For example, Patent Literature 1 discloses an insulated electric wire that is covered with a flame-retardant composition prepared by adding hydroxide magnesium that is a flame retardant to a resin or a rubber such as an ethylene-ethyl acrylate copolymer (EEA), polyethylene, and an ethylene propylene rubber.

CITATION LIST

Patent Literature

PL1: JP 3339154

SUMMARY OF INVENTION

Solution to Problem

However, the olefin resin is principally flammable, and the non-halogenous flame retardant is inferior in a flame-retardant effect in comparison with the halogenous flame retardant. Thus, in order to achieve sufficient flame retardancy, a large amount of metal hydroxide should be added in the non-halogenous flame-retardant composition. However, the conventional insulated electric wire in which a large amount of metal hydroxide is added has such a problem that mechanical properties such as wear resistance and cold resistance are remarkably lowered.

An object of the present invention is to provide a flame-retardant composition having excellent wear resistance and cold resistance, and a covered electric wire and a wiring harness using the same.

Solution to Problem

A flame-retardant composition according to the present invention includes abase resin that has a flexural modulus of 500 MPa or more and a Charpy impact strength at −20° C. of 1 KJ/$m^2$ or more, and a flame retardant that is a pulverized natural mineral containing magnesium hydroxide as a main ingredient.

It is preferable that the base resin contains polypropylene as a main ingredient.

It is preferable that the content of the magnesium hydroxide is 30 to 250 parts by mass with respect to 100 parts by mass of the base resin.

An insulated electric wire according to the present invention includes a conductor and the above-described flame-retardant composition that covers the conductor.

A wiring harness according to the present invention includes the above-described insulated electric wire.

Advantageous Effects of Invention

The flame-retardant composition according to the present invention that contains the base resin having the flexural modulus of 500 MPa or more achieves improved wear resistance. Because the base resin has the Charpy impact strength at −20° C. of 1 KJ/$m^2$ or more, sufficient cold resistance is achieved.

When the base resin contains polypropylene as the main ingredient, the advantages are significant.

When the content of the magnesium hydroxide is 30 to 250 parts by mass with respect to 100 parts by mass of the base resin, more excellent wear resistance and cold resistance are achieved.

In the insulated electric wire according to the present invention and the wiring harness including the insulated electric wire, the conductor is covered with the above-described flame-retardant composition. Accordingly, an insulated covering material is prevented from being degraded, which achieves long-term high reliability.

DESCRIPTION OF EMBODIMENTS

A detailed description of a preferred embodiment of the present invention will now be provided.

A flame-retardant composition according to the present invention includes a specific base resin, and magnesium hydroxide that is a flame retardant. The base resin has the flexural modulus of 500 MPa or more in view of improving wear resistance. If the base resin has the flexural modulus of less than 500 MPa, the composition is not sufficiently cured, and wear resistance cannot be improved. The base resin has the flexural modulus of preferably 600 MPa or more and more preferably 700 MPa or more. The upper limit of the flexural modulus of the base resin is not particularly limited. However, in view of flexibility, the base resin preferably has the flexural modulus of 5000 MPa or less, more preferably 4800 MPa or less, and still more preferably 4500 MPa or less. The flexural modulus of the base resin is measured preferably by the use of a tensile tester.

The base resin has the Charpy impact strength at −20° C. of 1 KJ/$m^2$ or more in view of achieving sufficient cold resistance. The Charpy impact strength is preferably 1.2 KJ/$m^2$ or more and more preferably 1.5 KJ/$m^2$ or more. The upper limit of the Charpy impact strength is not particularly limited. However, in view of achieving sufficient flexibility, the Charpy impact strength is preferably 100 KJ/$m^2$ or less, more preferably 98 KJ/$m^2$ or less, and still more preferably 95

KJ/m² or less. The Charpy impact strength of the base resin is measured in accordance with ISO 179.

The base resin preferably contains polypropylene as the main ingredient because polypropylene is low in price and easily achieves a high flexural modulus. For the resin containing polypropylene as the main ingredient, commercially available resins may be used. Examples of the resins that are commercially available, contain polypropylene as the main ingredient, have the flexural modulus of 500 MPa or more, and have the Charpy impact strength at −20° C. of 1 KJ/m² or more include "BC8", "BC6C", "BC6DR", "BC4ASW", and "BC3F" manufactured by JAPAN POLYPROPYLENE CORPORATION, "PB370A", "PB270A", and "PB170" manufactured by SUNALLOMER LTD., and "BJS-MU", "J704LB", "J704UG", "J705UG", "J356HP", "J452HP", "J466HP", "J762HP", "40300J", "45200", and "1108J" manufactured by PRIME POLYMER CO., LTD. The resins described above may contain a rubber component in order to control the flexural modulus and the Charpy impact strength.

The magnesium hydroxide that is the flame retardant is preferably derived from a natural mineral. The magnesium hydroxide is derived from so-called natural brucite and is manufactured by wet-pulverizing or dry-pulverizing the natural brucite containing the magnesium hydroxide as the main ingredient. The magnesium hydroxide is prepared by pulverizing the natural mineral, and thus the manufacturing cost is lower than that using a synthesized magnesium hydroxide.

The content of the magnesium hydroxide is preferably within the range of 30 to 250 parts by mass, more preferably within the range of 40 to 230 parts by mass, and still more preferably within the range of 50 to 200 parts by mass with respect to 100 parts by mass of the polymer component in the composition. If the content of the magnesium hydroxide is less than 30 parts by mass, flame retardancy is easily degraded, and if the content of the magnesium hydroxide is more than 250 parts by mass, sufficient mechanical properties are hard to achieve.

The magnesium hydroxide is made into particles by a pulverizing process. The average particle size of the pulverized magnesium hydroxide is preferably within the range of 0.1 to 20 μm. If the average particle size is less than 0.1 μm, secondary cohesion easily occurs, and mechanical properties of the composition including the flame retardant and the organic polymer are easily lowered. If the average particle size is more than 20 μm, an appearance of a covering material of an electric wire when the magnesium hydroxide is used as the flame retardant tends to be degraded. The average particle size is preferably within the range of 0.2 to 10 μm and more preferably within the range of 0.5 to 5 μm.

The pulverized magnesium hydroxide has large surface asperities, and therefore, adhesion with the resin is easily lowered. Thus, the magnesium hydroxide may be subjected to surface treatment. For a surface treatment agent, a fatty acid, a fatty acid salt, a fatty acid ester, a silane coupling agent, and a titanate coupling agent are preferably used. They may be used singly or in combination.

The content of the surface treatment agent is preferably within the range of 0.1 to 20 parts by mass, more preferably within the range of 0.3 to 10 parts by mass, and still more preferably within the range of 0.5 to 5 parts by mass with respect to 100 parts by mass of the magnesium hydroxide. If the content of the surface treatment agent is less than 0.1 parts by mass, an effect of improving characteristics of the electric wire is easily degraded, and if the content of the surface treatment agent is more than 20 parts by mass, excess of the thus-added surface treatment agent tends to remain as impurities, so that properties of the electric wire are easily degraded.

When using surface-treated magnesium hydroxide, magnesium hydroxide that is previously surface-treated with the surface treatment agent may be blended into the composition, or untreated magnesium hydroxide may be blended with the surface treatment agent in the composition for surface treatment, which is not particularly limited.

The flame-retardant resin composition according to the present invention, if needed, may include other additives provided that properties of the flame-retardant resin composition are not impaired. The additives are not particularly limited, and a filler, a pigment, an oxidation inhibitor, and an age inhibitor that are commonly used for the covering material of the electric wire may be used, for example.

A method of producing the flame-retardant resin composition according to the present invention includes the step of kneading the flame retardant and the base resin. The step of kneading the flame retardant and the base resin is preferably performed by the use of a generally used kneader such as a Banbury mixer, a pressure kneader, a kneading extruder, a twin-screw extruder, and a roll.

The kneading step may be performed such that the base resin is previously put in the kneader, and the flame retardant is added to the base resin being stirred, or may be performed such that the flame retardant is previously put in the kneader, and the base resin is added to the flame retardant being stirred. It is also preferable that the base resin and the flame retardant are dry blended by the use of a tumbler before kneading, and then the blended composition is put in the kneader so as to be kneaded.

The temperature during kneading is preferably such a temperature that the flame retardant is easily dispersed in the base resin. The temperature is preferably within the range of 100° C. to 300° C. and more preferably within the range of 120° C. to 280° C. After kneading, the flame-retardant composition is taken out from the kneader. In this occasion, it is preferable to mold the flame-retardant composition into pellet form by the use of a pelletizer.

Next, descriptions of an insulated electric wire according to the present invention and a wiring harness according to the present invention will be provided.

The insulated electric wire according to the present invention includes the flame-retardant resin composition described above as an insulated covering material. In the insulated electric wire, the insulated covering material may directly cover a conductor, or other intermediate material such as a shielded conductor or other insulator may be interposed therebetween.

The size and the material of the conductor are not particularly limited and may be determined according to the intended use. The thickness of the insulated covering material is not particularly limited, and may be determined in consideration of factors such as the size of the conductor.

The insulated electric wire described above may be prepared by extrusion-covering the conductor by the use of a generally used extrusion molding machine with the flame-retardant resin composition according to the present invention that is kneaded by the use of a generally used kneader such as a Banbury mixer, a pressure kneader and a roll.

The wiring harness according to the present invention includes the insulated electric wires described above. The wiring harness may be configured as an electric wire bundle composed only of the insulated electric wires described above, or may be configured as an electric wire bundle including an insulated electric wire covered with an organic polymer composition such as a vinyl chloride insulated electric wire and an insulated electric wire that does not include halogen elements. The electric wire bundle is preferably covered with a wiring-harness protective material, for example. The number of the electric wires is not particularly limited and may be arbitrarily determined.

The wiring-harness protective material covers the electric wire bundle, in which the plurality of insulated electric wires are bundled, to protect the electric wire bundle from the external environment, for example. Although the base material of the wiring-harness protective material is not particularly limited, a polyolefin resin composition such as polyethylene and polypropylene is preferably used. It is preferable that a flame retardant is appropriately added to the resin composition.

The wiring harness protective material may be selected from a tape-shaped base material on at least one side of which an adhesive is applied, and a tube-shaped or sheet-shaped base material according to the intended use.

Example

A more detailed description of the present invention will now be provided specifically with reference to Example. However, the present invention is not limited thereto.

1. Material Used, Manufacturer, and Other Information

Materials used in present examples and comparative examples are provided below along with their manufacturers, trade names, and other information.

(A) Base Resin (A-1) Polyethylene [manuf.: PRIME POLYMER CO., LTD., trade name: 40300J]

(A-2) Polyethylene [manuf.: PRIME POLYMER CO., LTD., trade name: 45200]

(A-3) Polyethylene [manuf.: PRIME POLYMER CO., LTD., trade name: 1108J]

(A-4) Polypropylene [manuf.: PRIME POLYMER CO., LTD., trade name: BJS-MU]

(A-5) Polypropylene [manuf.: SUNALLOMER LTD., trade name: PB270A]

(A-6) Polypropylene [manuf.: SUNALLOMER LTD., trade name: PB371A]

(A-7) Polyethylene [manuf.: PRIME POLYMER CO., LTD., trade name: 3550R]

(A-8) Polyethylene [manuf.: PRIME POLYMER CO., LTD., trade name: 4570]

(A-9) Polyethylene [manuf.: PRIME POLYMER CO., LTD., trade name: 25100J]

(A-10) Polypropylene [manuf.: JAPAN POLYPROPYLENE CORPORATION, trade name: NF4103]

(A-11) Polypropylene [manuf.: JAPAN POLYPROPYLENE CORPORATION, trade name: BX8HR]

(A-12) Polypropylene [manuf.: PRIME POLYMER CO., LTD., trade name: J108M]

(B) Flame Retardant

Magnesium hydroxide [manuf.: FIMATEC LTD., trade name: JUNMAG C]

(C) Antioxidant

Antioxidant [manuf.: CIBA SPECIALTY CHEMICALS INC., trade name: IRGANOX 1010]

Preparation of Flame-Retardant Composition and Insulated Electric Wire

First, the ingredients shown in the table given below were kneaded at a mixing temperature of 200° C. with the use of a twin-screw extruder and were pelletized by the use of a pelletizing machine. Accordingly, flame-retardant resin compositions according to the present examples and flame-retardant resin compositions according to the comparative examples were obtained. Then, by extrusion-covering conductors (cross sectional area: 0.5 mm$^2$), which are annealed copper strands prepared by bunching seven annealed copper wires, with the obtained compositions to have a thickness of 0.2 mm by the use of an extruder, insulated electric wires according to the present examples and the comparative examples were prepared.

Test Method

The insulated electric wires prepared as above were subjected to a cold-resistance test and a wear-resistance test. Hereinafter, descriptions of procedures of the tests and assessment criteria will be provided.

Cold-Resistance Test

The cold-resistance test was performed in accordance with JIS 03005. To be more specific, the insulated electric wires were cut into test specimens 38 mm long. Five test specimens were placed in a tester, and the test specimens were struck by a striking implement while being cooled. A temperature at which all of the five test specimens were broken is defined as a cool-resistance temperature. The insulated electric wire in which the cold-resistance temperature was −20° C. or less was regarded as passed.

Wear-Resistance Test

The wear-resistance test was performed by a blade-reciprocating method based on JASO D611-94. To be more specific, the non-halogenous insulated electric wires were cut into test specimens 750 mm long, and then at a room temperature of 23° C. plus or minus 5° C., a blade was made to reciprocate in a direction of its shaft over a length of 10 mm or more on a surface of the insulated covering material of each test specimen which was fixed to a table, and the number of reciprocation before the blade touches the conductor due to the wearing away of the insulated cove ring material was counted. At this time, a load imposed on the blade was set at 7 N, and the blade was set to reciprocate at a speed of 50 times per minute. Then, the test specimen was moved by 100 mm and rotated 90 degrees clockwise, and the measurement as described above was repeated. The measurement was performed four times in total with respect to one test specimen, and the one whose smallest reciprocation number was 200 or more was regarded as passed, and the one whose smallest reciprocation number was below 200 was regarded as failed.

Table 1 shows ingredient constitution and assessment results of the compositions of the prepared insulated electric wires (unit: parts by mass).

TABLE 1

| | | Flexural modulus (MPa) | Charpy impact strength at −20° C. (KJ/m²) | Present example | | | | | | Comparative example | | | | | |
|---|---|---|---|---|---|---|---|---|---|---|---|---|---|---|---|
| | | | | 1 | 2 | 3 | 4 | 5 | 6 | 1 | 2 | 3 | 4 | 5 | 6 |
| Constitution | (A) Base resin | | | | | | | | | | | | | | |
| | (A-1) Polyethylene | 500 | 1 | 50 | | | | | | | | | | | |
| | (A-2) Polyethylene | 600 | 6 | | 50 | | | | | | | | | | |
| | (A-3) Polyethylene | 1000 | 10 | | | 50 | | | | | | | | | |
| | (A-4) Polypropylene | 500 | 7 | | | | 50 | | | | | | | | |
| | (A-5) Polypropylene | 1000 | 10 | | | | | 50 | | | | | | | |
| | (A-6) Polypropylene | 1500 | 20 | | | | | | 50 | | | | | | |
| | (A-7) Polyethylene | 400 | 5 | | | | | | | 50 | | | | | |
| | (A-8) Polyethylene | 600 | 0.5 | | | | | | | | 50 | | | | |
| | (A-9) Polyethylene | 300 | 10 | | | | | | | | | 50 | | | |
| | (A-10) Polypropylene | 500 | 0.8 | | | | | | | | | | 50 | | |
| | (A-11) Polypropylene | 400 | 15 | | | | | | | | | | | 50 | |
| | (A-12) Polypropylene | 1500 | 0.8 | | | | | | | | | | | | 50 |
| | (B) Flame retardant | | | 49 | 49 | 49 | 49 | 49 | 49 | 49 | 49 | 49 | 49 | 49 | 49 |
| | (C) Antioxidant | | | 1 | 1 | 1 | 1 | 1 | 1 | 1 | 1 | 1 | 1 | 1 | 1 |
| Assessment | Cold resistance temperature (° C.) | | | −30 | −25 | −30 | −25 | −25 | −30 | −30 | −10 | −30 | −15 | −25 | −10 |
| | Wear resistance | | | Pass | Pass | Pass | Pass | Pass | Pass | Fail | Pass | Fail | Pass | Fail | Pass |

Table 1 shows that the insulated electric wires according to the comparative examples are inferior in any of the assessment items of flame retardancy, wear resistance, and cold resistance.

To be specific, the insulated electric wires according to the comparative examples 1, 3, and 5 in which the Charpy impact strength at −20° C. is 1 KJ/m² or more but the flexural modulus is less than 500 MPa are excellent in cold resistance but inferior in wear resistance.

The insulated electric wires according to the comparative examples 2, 4, and 6 in which the flexural modulus is 500 MPa or more but the Charpy impact strength at −20° C. is less than 1 KJ/m² are excellent in wear resistance but inferior in cold resistance.

In contrast, the insulated electric wires according to the present examples in which the flexural modulus is 500 MPa or more and the Charpy impact strength at −20° C. is 1 KJ/m² or more are excellent in both of cold resistance and wear resistance.

While preferred embodiments and examples of the present invention have been described above, it is to be understood that variations and modifications will be apparent to those skilled in the art without departing the scope and spirit of the present invention.

The invention claimed is:

1. A flame-retardant composition comprising:
  a base resin that has a flexural modulus of 500 MPa or more a Charpy impact strength at −20° C. of 1 KJ/m² or more, and an ethylene content of greater than 15% by mass of the base resin; and
  a flame retardant that is a pulverized natural mineral containing magnesium hydroxide as a main ingredient.

2. The flame-retardant composition according to claim 1, wherein the base resin contains polypropylene as a main ingredient.

3. The flame-retardant composition according to claim 2, wherein a content of the magnesium hydroxide is 30 to 250 parts by mass with respect to 100 parts by mass of the base resin.

4. An insulated electric wire comprising:
  a conductor; and
  the flame-retardant composition according to claim 3 that covers the conductor.

5. A wiring harness comprising the insulated electric wire according to claim 4.

6. An insulated electric wire comprising:
  a conductor; and
  the flame-retardant composition according to claim 2 that covers the conductor.

7. A wiring harness comprising the insulated electric wire according to claim 6.

8. The flame-retardant composition according to claim 2, wherein the base resin has an ethylene content by mass of at least 17%.

9. The flame-retardant composition according to claim 2, wherein the base resin has an ethylene content by mass of from 17% to 24%.

10. The flame-retardant composition according to claim 1, wherein a content of the magnesium hydroxide is 30 to 250 parts by mass with respect to 100 parts by mass of the base resin.

11. An insulated electric wire comprising:
  a conductor; and
  the flame-retardant composition according to claim 10 that covers the conductor.

12. A wiring harness comprising the insulated electric wire according to claim 11.

13. An insulated electric wire comprising:
  a conductor; and
  the flame-retardant composition according to claim 1 that covers the conductor.

14. A wiring harness comprising the insulated electric wire according to claim 13.

15. The flame-retardant composition according to claim 1, wherein the base resin has an ethylene content by mass of at least 17%.

16. The flame-retardant composition according to claim 1, wherein the base resin has an ethylene content by mass of from 17% to 24%.

* * * * *